(12) United States Patent
Buchs et al.

(10) Patent No.: US 6,219,315 B1
(45) Date of Patent: Apr. 17, 2001

(54) METHOD OF REGULATING THE FOCUSING AND GUIDING OF A LIGHT BEAM

(75) Inventors: Willy Buchs, Lonay (CH); Dieter Baas, Auenheim (DE); Roland Cochard; Pierre Jeannin, both of Morges (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,630
(22) PCT Filed: Oct. 1, 1997
(86) PCT No.: PCT/DE97/02257
  § 371 Date: Mar. 30, 1999
  § 102(e) Date: Mar. 30, 1999
(87) PCT Pub. No.: WO98/16924
  PCT Pub. Date: Apr. 23, 1998

(30) Foreign Application Priority Data
Oct. 14, 1996 (DE) .............................................. 196 42 343

(51) Int. Cl.$^7$ ..................................................... G11B 7/00
(52) U.S. Cl. ...................... 369/44.11; 369/247; 369/75.1
(58) Field of Search ............................... 369/44.11, 44.14, 369/44.32, 12, 75.1, 247, 251

(56) References Cited
U.S. PATENT DOCUMENTS
5,255,254 * 10/1993 Watanabe et al. ................... 369/75.1

FOREIGN PATENT DOCUMENTS
WO 92/04712   3/1992 (WO).

* cited by examiner

Primary Examiner—Nabil Hindi
(74) Attorney, Agent, or Firm—Michael J. Striker

(57) ABSTRACT

A method is proposed which serves to control the focusing of a light beam, aimed at a rotating recording medium (25) for reading data, of a scanner (15, 20) onto the recording medium (25) and the guidance of the light beam along the data tracks of the recording medium (25), each by means of a respective control circuit. The scanner (15, 20) and the recording medium (25) are mounted on a fundamental substrate (10) in at least one housing (1), and the at least one housing (1), together with the fundamental substrate (10), the scanner (15, 20) and the recording medium (25), forms a coupled mechanical oscillator, which is vibrated as a function of a vibration spectrum (75); the scanner (15, 20) is accelerated by the vibration and a relative motion of the recording medium (25) with respect to the scanner (15, 20) is effected, and the amplitudes of the relative motion and the accelerations have a frequency response. The masses, spring constants and damping values of the scanner (15, 20), the recording medium (25), the fundamental substrate (10), and the at least one housing (1) are selected such that the frequencies at which the amplitudes of the relative motion of the recording medium (25) relative to the scanner (15, 20) and the accelerations acting on the scanner (15, 20) are maximal are located in a frequency band of the respective control circuit in which an amplification is performed, and the maximum values of the amplitudes in that frequency band do not exceed a predetermined value.

12 Claims, 10 Drawing Sheets

METHOD OF REGULATING THE FOCUSING AND GUIDING OF A LIGHT BEAM

PRIOR ART

Figure 1:
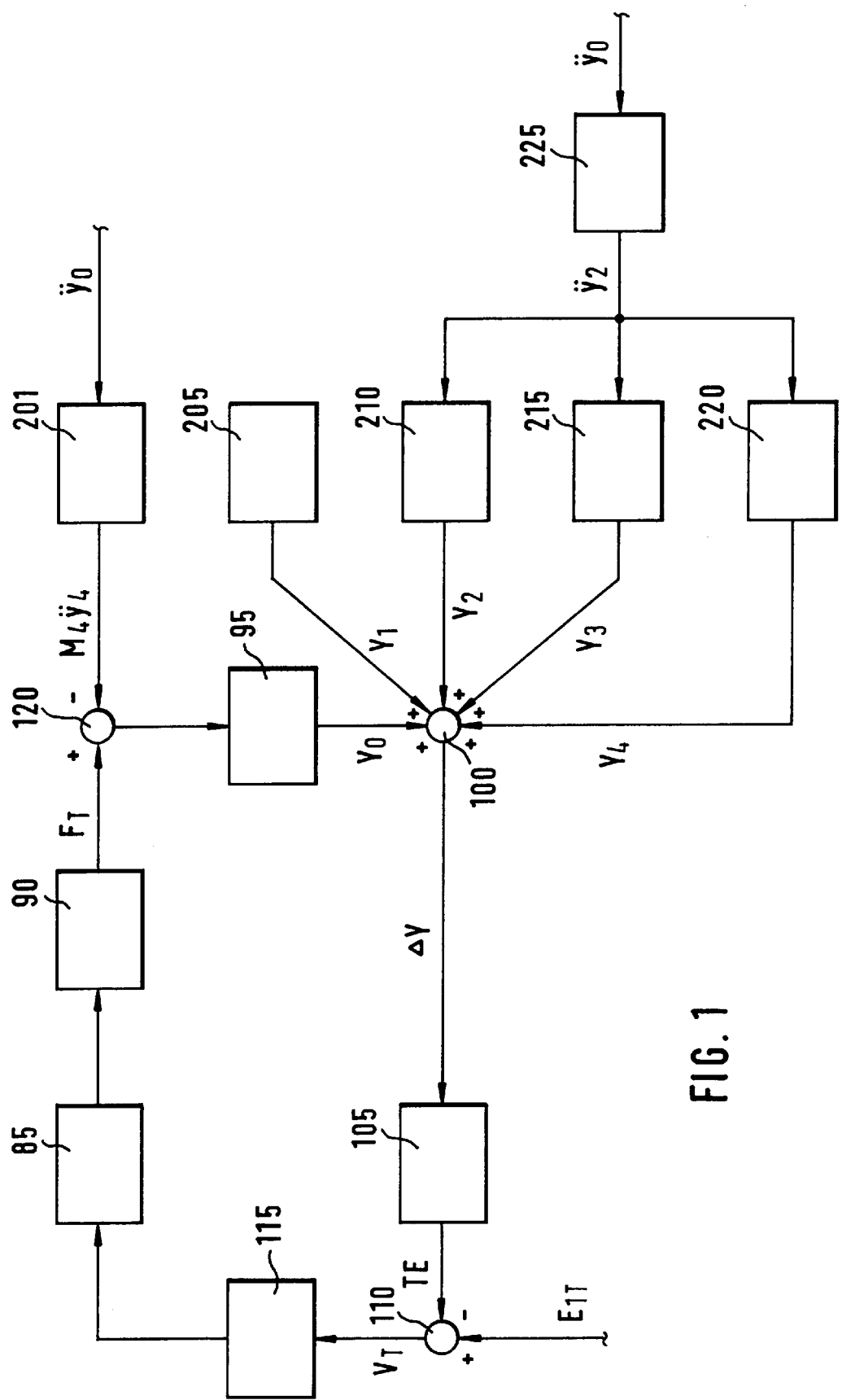

The invention is based on a method for controlling the focusing and guidance of a light beam as generically defined by the preamble to the main claim. From International Patent Disclosure WO 92/04712, a method is already known in which an optical scanner, whose objective lens focuses a light beam onto a rotating compact disk or CD by means of a focusing control circuit, outputs the data signal to an amplifier. The optical scanner also generates the actual value for a track controller and the actual value for the focus controller. The track controller furnishes a track error signal to the optical scanner, in order to guide the light beam along the data tracks of the CD. The focus controller generates a focus error signal for the optical scanner, in order to focus the light beam onto the disk by means of the objective lens.

ADVANTAGES OF THE INVENTION

The method according to the invention having the characteristics of the main claim has the advantage over the prior art that because of the adaptation of the mechanical oscillation behavior to the capabilities of the applicable control circuit and the suppression of amplitudes that exceed a predetermined value, spring means and damping means can be economized on since vibration of the housing that affects the control devices can be better compensated for. In this way, production and assembly expenses are saved, and the space needed and the weight are reduced.

By means of the provisions recited in the dependent claims, advantageous refinements of and improvements to the method defined by the main claim are possible.

It is especially advantageous that the masses, spring constants and damping values of the scanner, the recording medium, the fundamental substrate, and the at least one housing are selected such that the frequencies at which the amplitudes of the relative motion of the recording medium relative to the scanner and the accelerations acting on the scanner are maximal exceed a value of approximately 60 Hz. In this way, the frequencies at which the amplitudes of the relative motion of the recording medium with respect to the scanner and the accelerations acting on the scanner are maximal are outside a range from 10 Hz to 30 Hz, in which the spectral density of the vibration spectrum is motor vehicles is maximal. Thus the effects on the aforementioned amplitudes and accelerations of the vibration acting on the motor vehicle are reduced considerably.

It is also advantageous to select the time constants of a differentiator in the respective control circuit in such a way that the width of the applicable frequency band for the control is adapted to the frequency range having the maximal values of the amplitudes, and the predetermined stability reserve is adhered to. In this way, the control circuits can also be tuned to the coupled mechanical oscillator, which makes improved resistance to vibration possible.

The use of an integrator in the applicable control circuit whose time constants are selected such that the amplification in the applicable frequency band for the control is increased to a first predetermined value, and the predetermined stability reserve is adhered to is also especially advantageous. In this way, the applicable control deviation can be reduced, above all in the low-frequency range. Since the vibration spectrum has especially high amplitudes at low frequencies, a major improvement in vibration resistance is obtained precisely in this range.

The use of a proportional amplifier with which an increase in amplification and bandwidth of the frequency range for the control, in each case to a second predetermined value, is performed is also advantageous. In this way, the adaptation of the control loops to the coupled mechanical oscillator is improved further, and the control deviation is reduced further, once an amplification resulting in improved resistance to the vibration.

By increasing the amplification at the points in the applicable frequency band for the control where the effects of vibration on the motion of the recording medium relative to the scanner are maximal, the control deviation is advantageously reduced still further in a targeted way by means of an additional amplifier, and thus the resistance to the vibration is further increased. It is also especially advantageous, in the assembly of the coupled oscillator, to not allow a predetermined frequency value to undershoot the natural frequency of the fundamental substrate and/or by the natural frequency of the at least one housing. In this way, the space needed for the oscillations of the fundamental substrate in the at least one housing can be reduced, since the amplitude of oscillation of the fundamental substrate becomes less. As a result, special damping means for damping the fundamental substrate in the at least one housing are no longer necessary, either. Expense, effort, space and weight are thus saved.

Another advantage is obtained by the choice of the natural frequency of components of the coupled mechanical oscillator above 60 Hz. In this way, the frequencies at which the amplitudes of the relative motion of the recording medium with respect to the scanner and the accelerations acting on the scanner are maximal can be placed especially simply in a range that is outside the maximum spectral density of the vibration spectrum.

Another advantage is that a particular predetermined value for the amplification factors, in a frequency range of maximum spectral density of the vibration spectrum, is not undershot; the value is predetermined such that a predetermined control precision of the control circuits is adhered to. In this way, position errors in scanning the recording medium, which result from vibration of the motor vehicle in the range of the maximum spectral density of the vibration spectrum between 10 Hz and 30 Hz, can be better compensated for by the control circuit. The choice of the rotary speed of the recording medium in such that the frequencies of interference signals, which occur because of defects in the recording medium, are located in a frequency range in which in which an intended damping by the applicable control circuit is not undershot is especially advantageous. In this way, it is possible to increase the error tolerance of the reader to defects in the recording medium.

It is especially advantageous to fasten the recording medium between a first and second plate in such a way that its natural frequency is within a predetermined range; a bell-like fastening of the recording medium has proved to be especially favorable. In this way, the motions of the recording medium relative to the scanner that are dictated by the vibration of the at least one housing can be kept especially slight. The resistance to vibration is thus improved still further.

It is also advantageous to use a damping material for the first plate that is flexible at right angles to the plane of the plate. The amplitude of oscillation of the recording medium fastened between the first and second plates is thus reduced, making it easier to control the position of the scanner.

DRAWING

Figure 2:
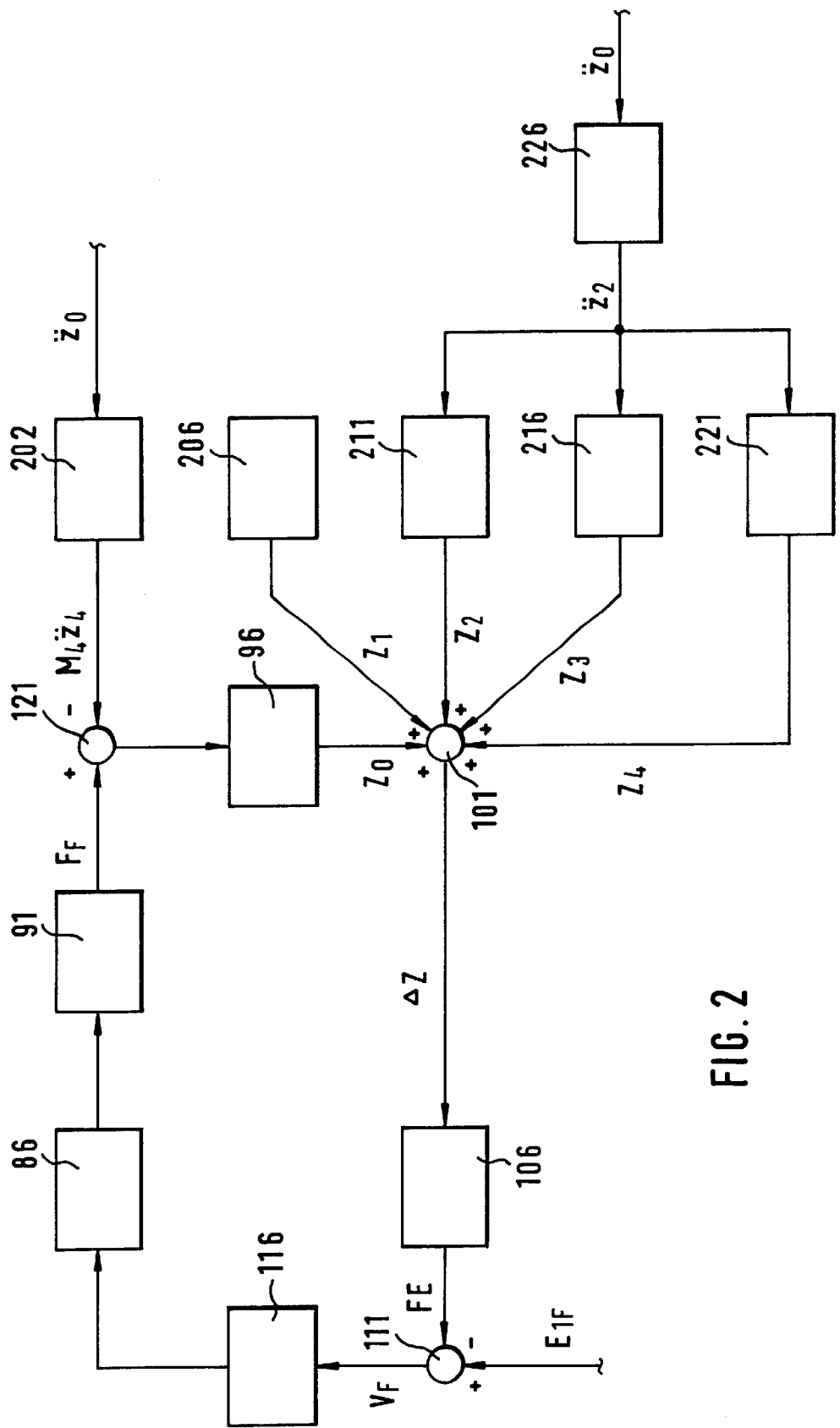
Figure 3:
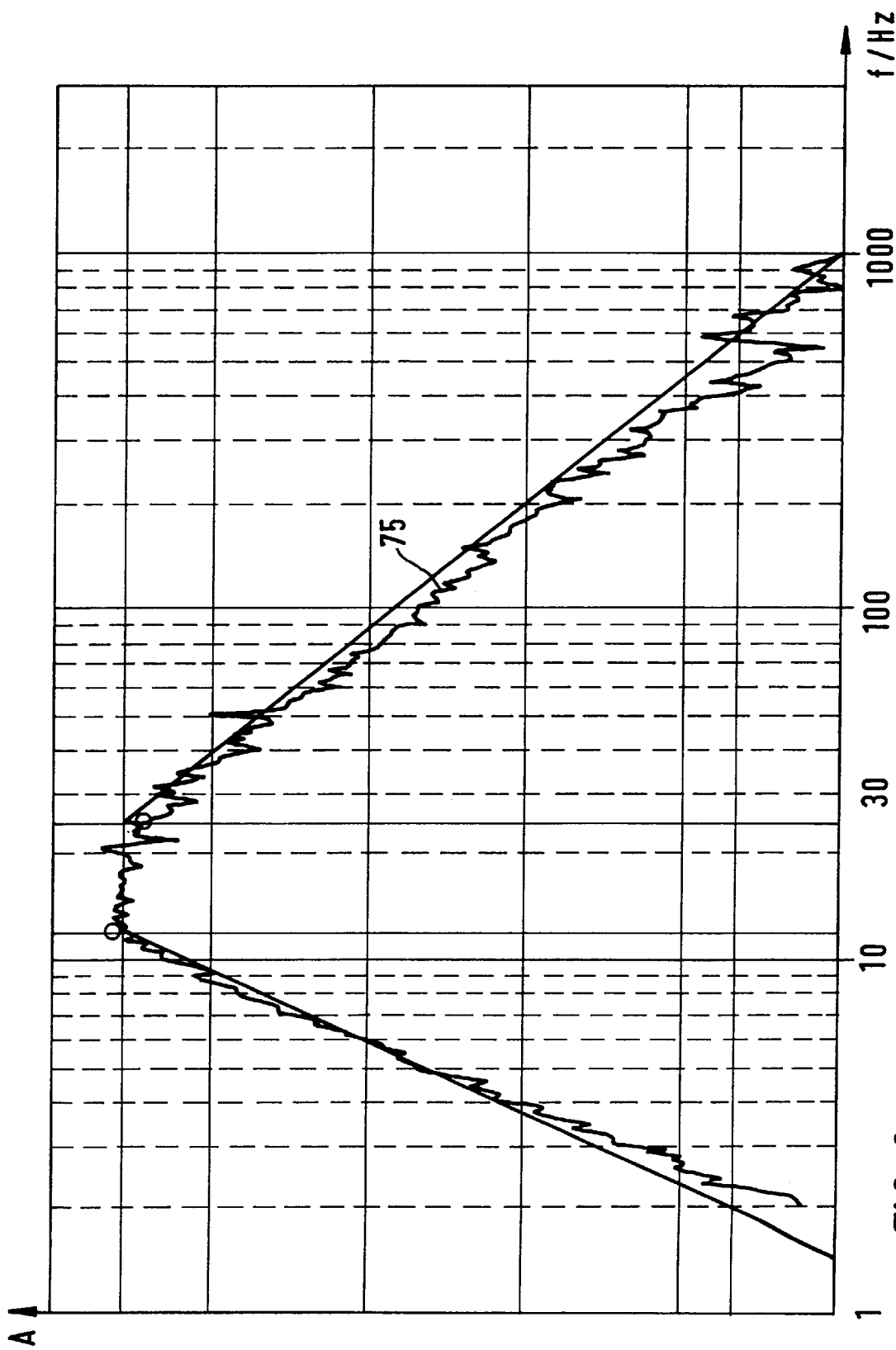
Figure 4:
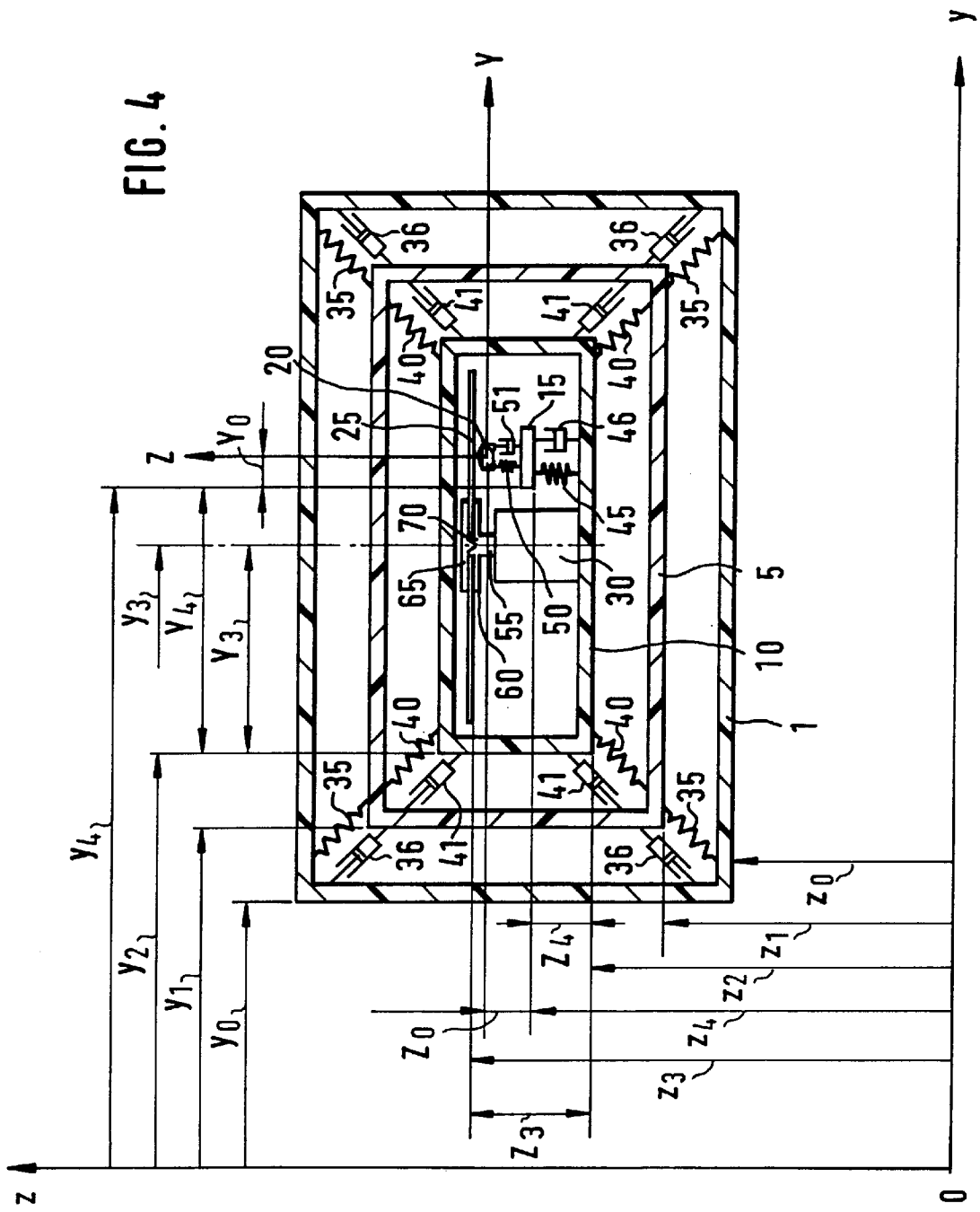
Figure 5:
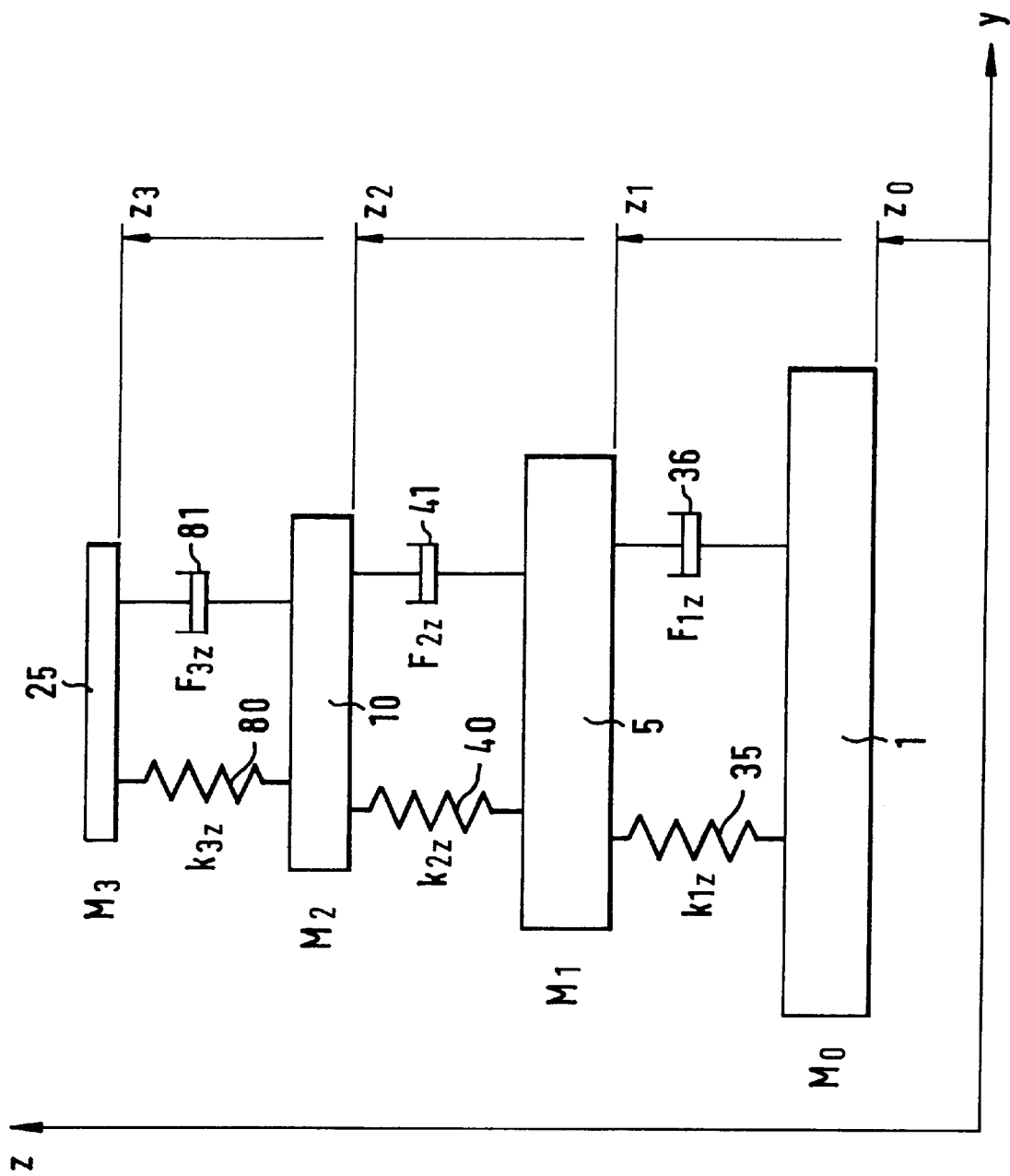
Figure 6:
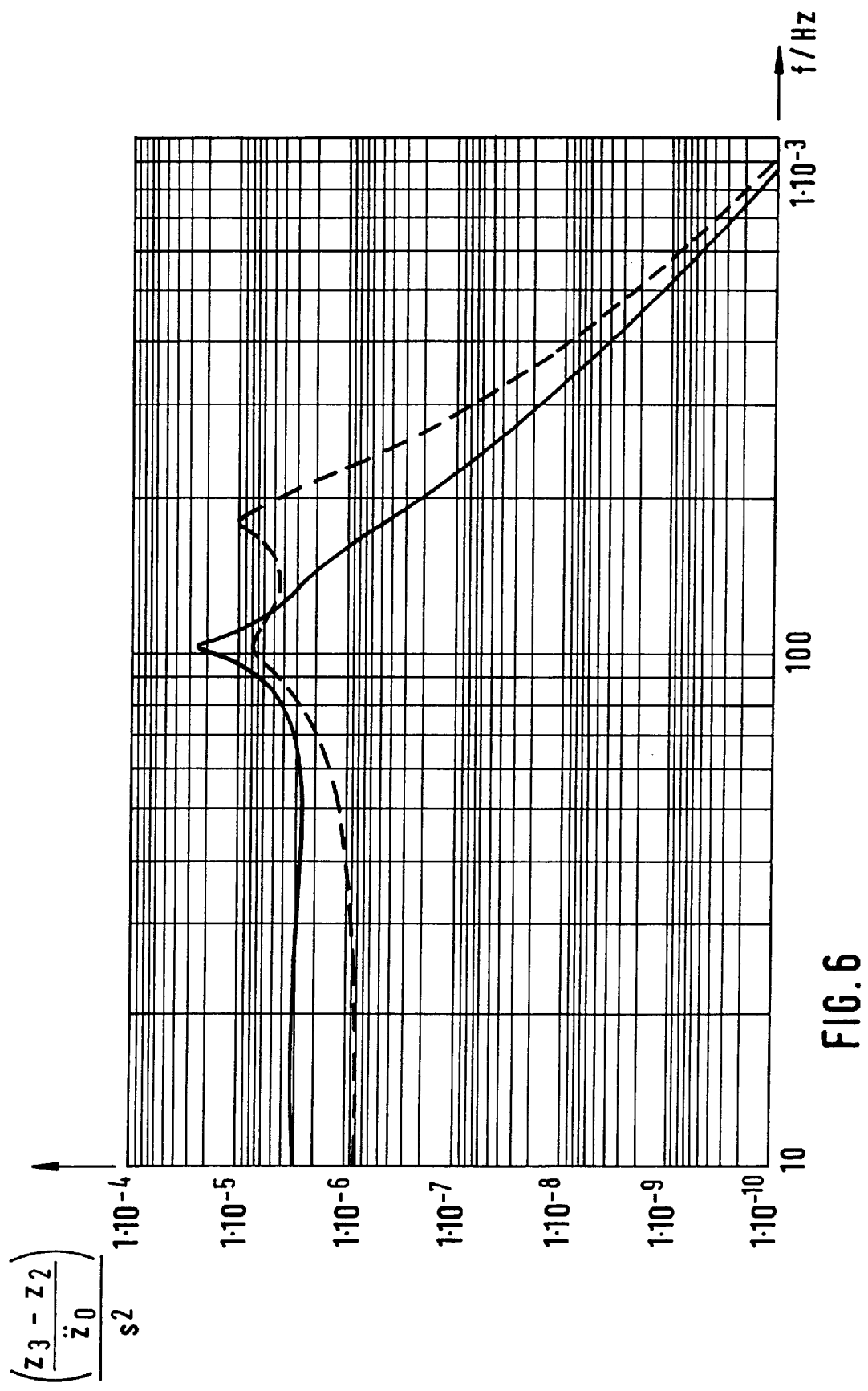
Figure 7:
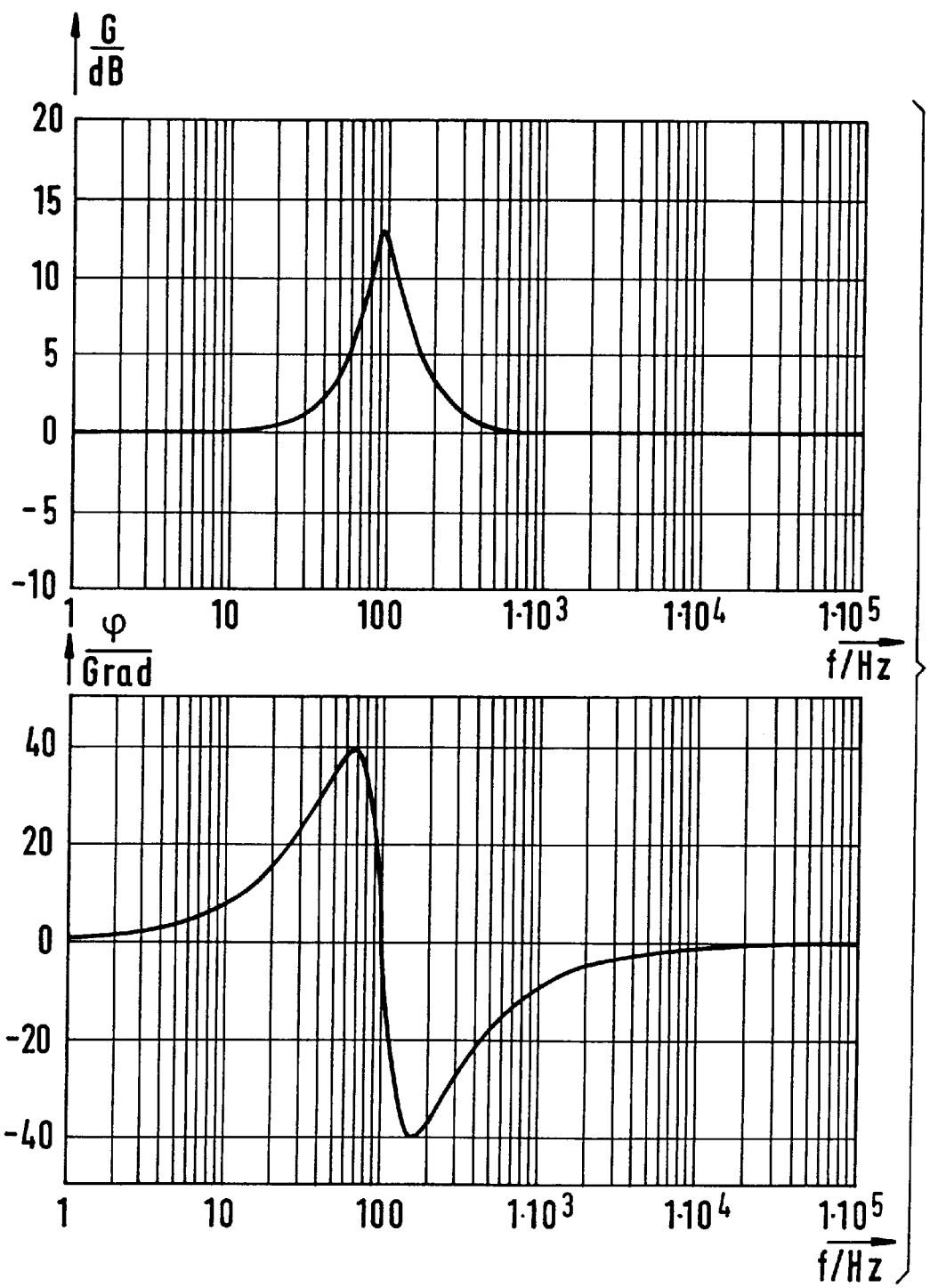
Figure 8:
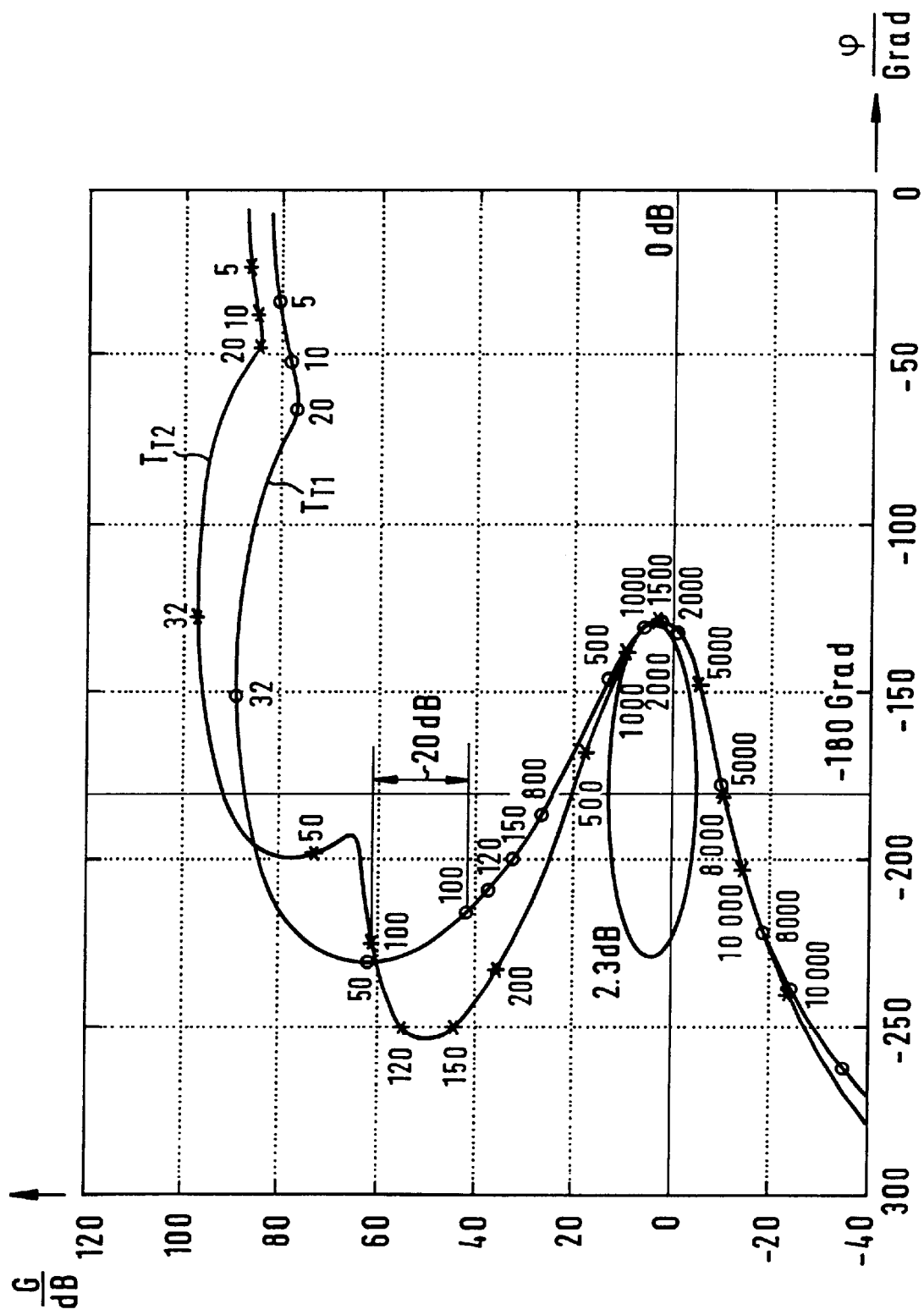
Figure 9:
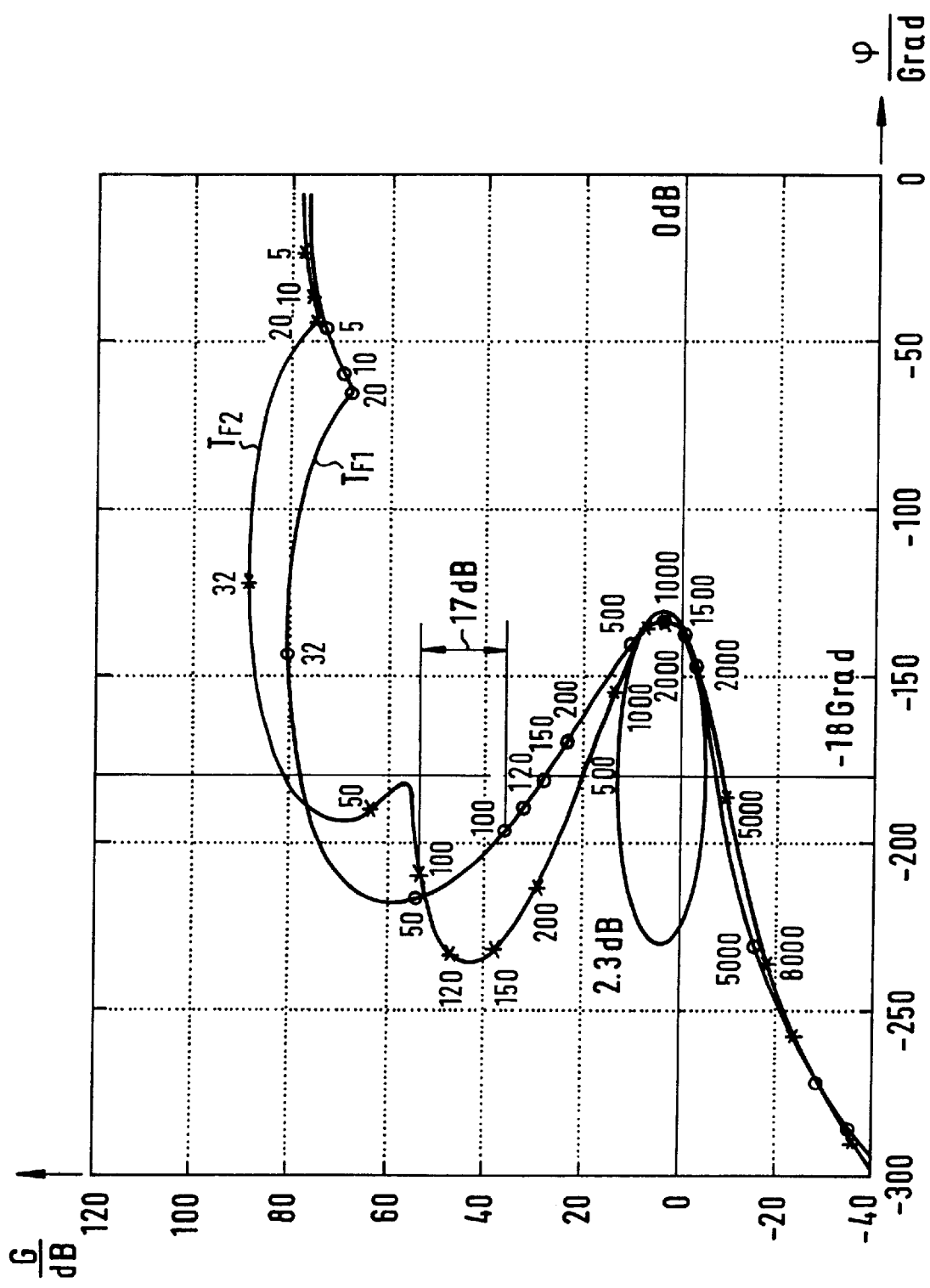
Figure 10:
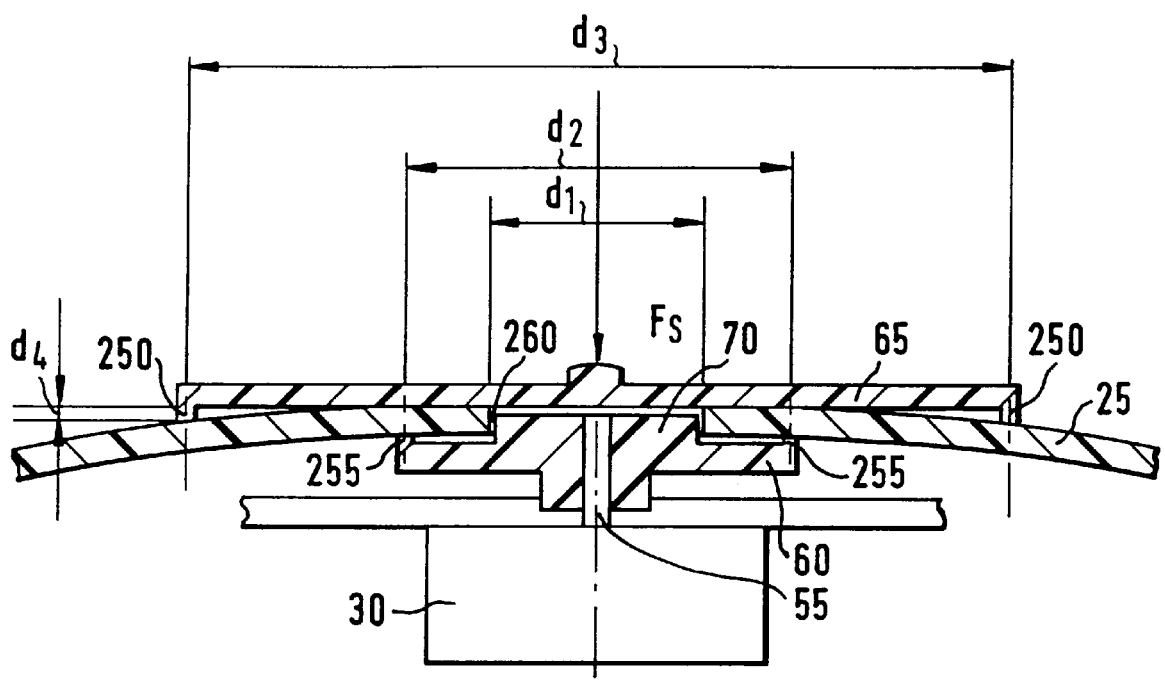

An exemplary embodiment of the invention is shown in the drawing and described in further detail in the ensuing description. Shown are:

FIG. 1, a track control circuit;

FIG. 2, a focusing control circuit;

FIG. 3, a vibration spectrum;

FIG. 4, a CD drive in a car radio housing;

FIG. 5, the model of a coupled mechanical oscillator;

FIG. 6, a graph illustrating the influence of vibration on the motion of the recording medium, plotted over the frequency;

FIG. 7, the transmission function of an additional amplifier in a mount and phase;

FIG. 8, the Black graph of the transmission function of the track control circuit;

FIG. 9, the Black graph of the transmission function of the focusing control circuit;

FIG. 10, the securing of a recording medium between two plates; and

Figure 11:
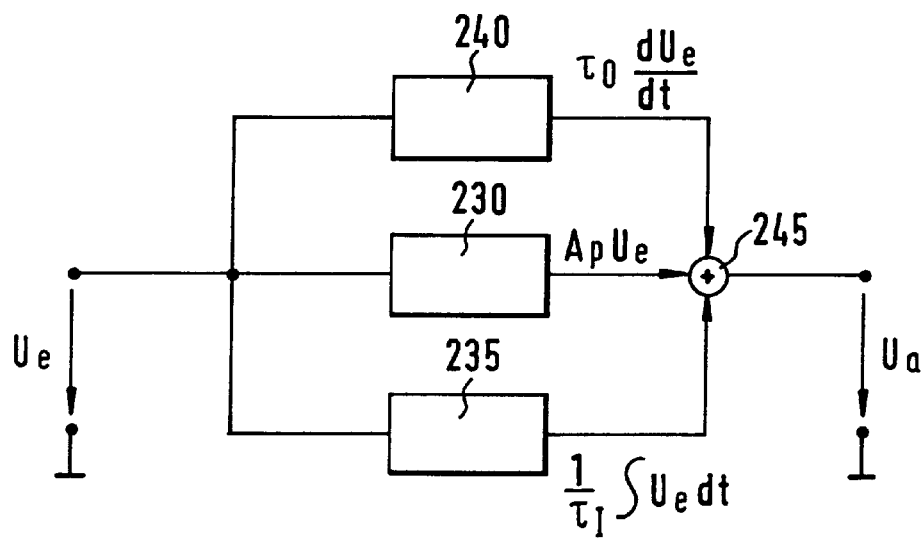

FIG. 11, the block circuit diagram of a PID controller.

DESCRIPTION OF THE EXEMPLARY EMBODIMENT

In FIG. 4, the rectangular cross section of a housing 5 of a compact disc drive is shown, which is secured in a further housing 1, for instance a car radio of rectangular cross section. Instead of a CD drive, some other drive may also be provided, for instance a magnetooptical drive or a DVD (Digital Video Disc) drive can also be disposed directly in the further housing 1, without its own housing 5. Four springs 35 and four dampers 36 are provided as fastening means; they each connect one outer edge of the housing 5 of the CD drive to the next closest inner edge of the housing 1 of the car radio. In the same way via four springs and four dampers 41, a fundamental substrate 10 of rectangular cross section is secured in the housing 4 of the CD drive. A CD motor 30 is connected to the fundamental substrate 10 and via a shaft 55 drives a recording medium 25, embodied as a compact disk or CD, which is fastened between a first plate 60, connected to the shaft 55, and a second plate 65. The first plate 60 has an axially symmetrical protrusion 70 for centering the CD 25; the protrusion 70 engages an opening in the CD 25, corresponding with the protrusion 70, for centering the CD 25 with the shaft 55. For fastening the CD 25, the second plate 65 is connected to the first plate 60 via the protrusion 70. A scanner 15, 20 comprises a reading head 15, which is connected via a spring 45 and a damper 46 to the fundamental substrate 10, and an objective 20, which is connected to the reading head 15 via a spring 50 and a damper 51. For reading data on the rotating CD 25 driven by the motor 30, the scanner 15, 20 aims a light beam, via the objective 20, at the CD 25; the light beam serves to scan the data tracks made on the CD 25 so as to detect the information installed on the CD 25. To avoid reading errors, it is especially important that the light beam be guided along the data tracks and focused on the CD 25. The housing 1 of the car radio installed in a motor vehicle is exposed, together with the CD drive it contains, to various kinds of vibration. Accelerations whose spectral density can be measured act: on the housing 1 of the car radio. Measuring the vibration spectrum has been done for various motor vehicles and under various road conditions. A typical vibration spectrum 75 is shown in FIG. 3 and shows the spectral density A of the accelerations as a function of the frequency f. The spectral density is maximal between 10 Hz and 30 Hz. In the CD drive, the CD 25 is read via the objective 20; the position of the objective 20 is tracked by two position control circuits. A track control circuit must maintain the position of the objective axis relative to the track being read on the CD 25 with an accuracy of ±0.2 μm, as a rule. A focusing control circuit must maintain the spacing of the objective from the metal surface of the CD 25 with a precision of ±2 μm. In the frequency range of maximum spectral density of the vibration spectrum 75, maintaining the aforementioned control precision requires that the amplification factors of the two control circuits be selected to be sufficiently high. Since the car radio housing 1 is subject to the vibration resulting from the vibration spectrum 75, the CD 25, reading head 15 and its objective 20 undergo changes of position relative to one another, which are largely corrected by the two control circuits. Nevertheless, each control circuit is subject to a position error that depends on the amplitudes and acceleration frequencies of the vibration spectrum. At each frequency and for each control circuit, there is a maximum acceleration value, above which the position error becomes so great that a reading error occurs when the CD 25 is scanned. The objective 20 of the reading head 15 loses the track it has just read, causing an interruption in playback. When CDs 25 are used as information media, incorrect detection of digital information can also occur.

In addition, all CDs 25 have a certain number of defects, such as scratches, fingerprints, zones of unreadable or missing information, and so forth. As long as the objective 20 follows the track with the requisite precision, the digital processing of the information read from the CD 25 allows these defects to be corrected by utilizing redundance. Nevertheless, the optoelectronic pickups provided to measure the objective position relative to the CD 25 also are subject to these defects, which affect the reflection of the light beam. Incorrect position information is then furnished to the control circuits, and the objective 20 loses the track. It is therefore necessary for the CD drive to be maximally tolerable of defects in the CD 25. These two conditions, one being resistance to vibration in the vibration spectrum and the other being tolerance to defects of the CD 25, can be met simultaneously. To that end, the following provisions are taken:

1. In the selection of the reading head 15, the properties of the mechanical oscillation modes of the elastic suspension of its objective 20 are taken into account. The selection of these modes determines the sensitivity to oscillation of the reading head 15 and the capability of realizing broad-band positions controls. Thus a reading head 15 in which, above its natural frequency, only insignificant mechanical oscillation modes of the elastic suspension of the objective 20 occur, is used.

2. The chain of mechanical systems that extend from the housing 1 of the car radio to the reading head 15 and the CD 25 has optimal properties for filtering the acceleration, in order to isolate the reading head 15 and the CD 25 as well as possible and to minimize their relative changes of position.

3. The correction networks of the two control circuits of the objective position of the reading head 15 are adapted to the chain of mechanical systems and to the vibration spectrum.

The CD 25 is fastened with a relatively high force, for instance 1.5 N, between the first and second plates 60 and 65, which are made to rotate by the motor 30; the fastening forces of the CD 25 at the outer edge of the two plates 60 and 65 act on the CD 25, and both plates 60 and 65 have the same radius. The reading head 15, whose fastening to the fundamental substrate 10 is shown only schematically in FIG. 4 by way of the spring 45 and the damper 46, is in reality mounted on a transport mechanism which moves the reading head 15 along the radius of the CD 25. The transport mechanism mounted on the fundamental substrate 10 includes, among other elements, a screw in nut system and a guide system. All the mechanical plays in this transport mechanism are suppressed, in this example, by forces between 1 N and 2 N. If the car radio housing is subjected to vibration resulting from the vibration spectrum, the accelerations on the reading head 15 and the CD 25 are transmitted over the entire chain of mechanical systems, being amplified or damped in accordance with the oscillation modes of the systems traversed. The various oscillation modes are coupled to one another, so that the various mechanical systems shown in FIG. 4 together form a coupled mechanical oscillator. The accelerations transmitted act simultaneously on the CD 25, the reading head 15, and the objective 20.

In FIG. 4, the cross section of the coupled mechanical oscillator is shown in the y-z plane. The y direction represents the radial direction, that is, the direction in which the scanner 15, 20 is moved radially by the CD motor 30 along the outer edge of the CD 25 to follow the track. The track control is operative in this direction. The z direction is the focusing direction, which extends perpendicular to the plane of the CD 25 and is thus also perpendicular to the radial direction. The focusing control therefore takes place in the z direction. If vibration of the car radio housing 1 occurs, it can naturally also cause position errors in the x direction of the light beam with respect to the corresponding track of the CD 25. In contrast to the radial deviation from the track in the y direction, the deviation in the x direction is a tangential deviation from the track, which leads to jittering. In the tangential direction, however, as a rule no control circuit is provided, so that the reduction or avoidance of jittering must be done by means of a suitably stable assembly that is damped in the tangential direction.

In FIG. 4, various position indications are shown based on the y-z coordinate system. In it, $y_0$, $z_0$ are the positions of the car radio housing 1, and $\ddot{y}_0$, $z^*_0$ are then the accelerations that the car radio housing 1 undergoes. $y_1$, $z_1$ are the positions of the housing 5 of the CD drive, and corresponding $\ddot{y}_1$, $z^*_1$ are the accelerations that it undergoes. $y_2$, $z_2$ are the positions of the fundamental substrate 10, and $\ddot{y}_2$, $z^*_2$ are the accelerations that it undergoes. $y_3$ is the position of the CD axis, and $z_3$ is the position of the tracks of the CD 25 in the vicinity of its outer edge. The spacing between the center of this CD 25 and the fundamental substrate is constant, as dictated by construction. $y_4$ and $z_4$ are the positions of the reading head 15. Y3 and Z3 are the spacings of the fundamental substrate 10 from the CD 25. $Y_4$ and $Z_4$ are the spacings of the reading head 15 from the fundamental substrate 10. $Y_0$ and $Z_0$ are the spacings of the objective 20 from the reading head 15, on which the reference photo diodes that measure these spacings are mounted. The CD 25 and the reading head 15 are mounted on the fundamental substrate 10, and since the fundamental substrate experiences the acceleration $\ddot{y}_2$ and $z^*_2$, they move relative both to the fundamental substrate 10 and to one another.

As seen in FIG. 4, the CD 25 is fastened between the two plates 60 and 65; the radii of the two plates 60 and 65 are shorter than the radius of the CD 25. If the fundamental substrate 10 now executes a motion in the z direction with an acceleration $z^*_2$, then center of the CD 25 undergoes the same acceleration. The outer edge of the CD 25 has a motion, differing from this, having the acceleration $Z^*_3$, since the CD 25 is flexible, and bending moments are generated because of the inertial forces acting on the various elements that have mass. The deformed CD 25 is axially symmetrical and has a bell shape. The CD 25 behaves like an oscillator whose natural frequency is $f_{3z}$ and whose damping coefficient is $a_{3z}$.

Relative to the fundamental substrate 10, the amplitude of the oscillation in the z direction is zero at the center of the CD 25 and maximal at the outer edge. The natural frequency $f_{3z}$ depends on the diameters of the two plates 60 and 65, between which the CD 25 is fastened, and on the dimensions and material of the CD 25. If the two plates 60 and 65 each have a diameter of 30 mm, then the natural frequency is as a rule 100 Hz for CDs 25 that are 12 cm in diameter; because of tolerance, the natural frequency ranges between 90 Hz and 100 Hz. In general, a natural frequency above 60 Hz for the CD 25 is suitable for placing the maximum amplitudes of the relative motion of the CD 25 relative to the scanner 15, 20 in a frequency range above the maximum spectral density of the vibration spectrum 75, and thereby to reduce its influence on these amplitudes considerably. The measured damping coefficient is $a_{3z}=0.02$. The CD 25 is therefore a highly resonant oscillator. The oscillations of the CD 25 are induced by the accelerations undergone by the fundamental substrate 10, and the resultant amplitudes depend on the vibration spectrum 75. The measurements performed at the outer edge of the CD 25 show that these amplitudes not infrequently reach ±300 μm. However, the objective of the reading head 15, which is positioned by the focusing control in the z direction, must follow the motion of the CD 25 in the z direction with a precision of ±2 μm.

To describe the relative motion of the CD 25 with respect to the fundamental substrate 10 and the effect of the acceleration $z^*_0$ of the car radio housing 1, in FIG. 5 a system of three coupled oscillators in the y-z plane is shown. In this model, the car radio housing 1 has the mass $M_0$ and is connected to the housing 5 of the CD drive, which has the mass $M_1$, via the spring 35 having the spring constant $k_{1z}$ and the damper 36 having the damping value $F_{1z}$. The housing 5 of the CD drive is in turn connected to the fundamental substrate 10, which has the mass $M_2$, via the spring 40 having the spring constant $k_{2z}$ and the damper 41 having the damping value $F_{2z}$. In this model, the fastening of the CD 25 to the fundamental substrate 10 is described by means of a spring 80 with the spring constant $k_{3z}$ and with the damper 81 having the damping value $F_{3z}$; the mass $M_3$ represents the mass in motion of the CD 25. The positions in the z direction of the four masses shown are represented analogously to FIG. 4 by $z_0$, $z_1$, $z_2$ and $z_3$. The result is the three differential equations below, which describe the motions of the three coupled oscillators with the masses $M_1$, $M_2$ and $M_3$ of this system, when the housing 1 of the car radio experiences an acceleration $z^*_0$ in the z direction:

$$M_1\ddot{z}_1+k_{1z}(z_1-z_0)+F_{1z}(\dot{z}_1-\dot{z}_0)+k_{2z}(z_1-z_2)+F_{2z}(\dot{z}_1-\dot{z}_1)=0$$

$$M_2\ddot{z}_2+k_{2z}(z_2-z_1)+F_{2z}(\dot{z}_2-\dot{z}_1)+k_{3z}(z_2-z_3)+F_{3z}(\dot{z}_2-\dot{z}_3)=0$$

$$M_3\ddot{z}_3+k_{3z}(z_3-z_2)+F_{3z}(\dot{z}_3-\dot{z}_2)=0$$

The oscillations of the CD 25 with the mass $M_3$ in motion relate to the outer edge of the CD 25, where the greatest oscillation amplitude is observed. Of interest here is the spacing $(z_3-z_2)/z^*_0$ of the outer edge of the CD 25 relative to the fundamental substrate 10 for an acceleration $z^*_0$ of the car radio housing 1, and the ratio $z^*_2/z^*_0$ the acceleration as the fundamental substrate 10 relative to the acceleration of the car radio housing. By the choice of the masses, spring constant and damping values, the natural frequencies and damping constants of the coupled mechanical oscillators are also determined. Thus the natural frequency is $f_i^2=k_i/$ ($4\pi^2 M_i$), and the damping constant is $a_i = F_i/(4\pi^2 f_i M_i)$, where i=1, 2, 3. The is true both for the motion in the y direction and in the z direction, but the masses in motion, the spring constants and the damping values can be different, depending on the direction of motion. The case described in FIG. 5 applies to motions in the z direction, but can also be employed analogously for the motion in the y direction. The choice of the parameters named, for a given vibration spectrum 75, determines the amplitudes resulting from the CD 25 relative to the fundamental substrate 10 and the accelerations of the fundamental substrate 10, in each case with respect to the acceleration of the car radio housing 1 as a function of the frequency, or in other words in the z direction, the interference variables of the focus control.

The reading head 15 with the objective 20 is mounted with the least possible mechanical play on the fundamental substrate 10 via a guide system and moves relative to the fundamental substrate 10 under the influences of accelerations $\ddot{y}_0$ and $z^*_0$ of the car radio housing 1 in the y direction and z direction. This motion can also be modeled with the aid of three coupled oscillators. The relative motions of the CD 25 and reading head 15 relative to the fundamental substrate 10 make it possible to describe the interference variables that result from the vibration of the car radio housing 1 and act on the two position control circuits.

In FIG. 6, the ratio $(z_3-z_2)/z^*_0$ is plotted in $s^2$ over the frequency f in Hertz. Two curves are shown, which result from calculation using the above differential equations for various parameter values. The same masses were chosen for both curves, namely $M_1=0.5$ kg, $M_2=0.15$ kg, and $M_3=0.05$ kg. For the solid-line curve, the natural frequencies $f_{1z}=150$ Hz, $f_{2z}=20$ Hz and $f_{3z}=100$ Hz were also selected, and for the damping constants the values $a_{1z}=0.15$, $a_{2z}=1$, and $a_{3z}=0.02$. For the curve drawn in a dashed line, $f_{1z}=130$ Hz, $f_{2z}=160$ Hz and $f_{3z}=180$ Hz were selected for the natural frequencies and $a_{1z}=0.15$, $a_{2z}=0.15$ and $a_{3z}=0.02$ were selected for the damping constant. The curve drawn in a solid line represents a version with dampers in which the CD 25 oscillates at 100 Hz. The curve drawn in dashed lines represents a version without dampers, in which the CD 25 oscillates a frequency of 180 Hz. In the curve drawn in dashed lines, the relative deviation of the outer edge of the CD 25 from the fundamental substrate 10, at the frequency of approximately 100 Hz where the curve drawn in solid lines is at a maximum, is three times less than for the solid-line curve. The maximum amplitude is at 180 Hz for the curve drawn in dashed lines and there has the value $10^{-5}$ $s^2$ and is thus less than the maximum point on the curve drawn in solid lines at 100 Hz, which is $2.5 \cdot 10^{-5}$ $s^2$. At the frequency of 180 Hz, however, in FIG. 3 the amplitudes of the accelerations shown in the vibration spectrum 75 are less. The same is analogously true for the accelerations acting on the scanner 15, 20 and for the relative motions of the reading head 15 in both the y direction and the z direction relative to the fundamental substrate 10. Furthermore, the maximum values of the amplitudes of the frequency band can be limited to a predetermined value, which in FIG. 6 is $10^{-5}$ $s^2$ for the curves drawn in dashed lines. It can accordingly be seen from FIG. 6 that by varying the parameters M, k and F, both the amplitudes and the frequency band of the maximal interference that occurs can be influenced. In this way, by a suitable choice of the masses, spring constants and damping values in the assembly of the scanner 10, 20, the CD 25, the fundamental substrate 10, the housing 5 for the CD drive, and the housing 1 for the car radio to make a coupled oscillator, the frequencies of the vibration spectrum 75 for the car radio housing 1 that result upon vibration of the coupled oscillator, at which frequencies the amplitudes of the relative motion of the CD 25 relative to the scanner 15, 20 and the accelerations acting on the scanner 15, 20 are maximal, can be shifted to a frequency band of the focusing or track control circuit in which an amplification is performed and a predetermined stability reserve is maintained, and the maximum values of the amplitudes in the frequency band can be limited to a predetermined value. In the exemplary embodiment described, these frequencies, based on the situation in FIG. 6 are 100 Hz, and 180 Hz, respectively, or in other words above a frequency value of 60 Hz and thus far enough above the frequency range of maximum spectral density in the vibration spectrum 75, so that the influence of the vibration spectrum 75 on the aforementioned amplitudes and accelerations is reduced considerably.

In FIG. 1, a block circuit diagram of the track control circuit and in FIG. 2 a block circuit diagram of the focus control circuit are shown. The two block circuit diagrams are similar to one another and differ only in the parameter values of the transmission functions that characterize each block of the block diagram. The track control loop includes a power amplifier 85. Connected to the power amplifier 85 is an actuator 90, which adjusts the control position of the objective 20 of the reading head 15 in the y direction with a force $F_T$. The objective 20 is identified with its elastic suspension in FIG. 1 by reference numeral 95. The position of the objective 20 relative to the CD 25 is measured by the reference photodiodes mounted on the reading head 15. By exertion of force on the objective 20 in the y direction, the spacing $Y_0$ of the objective 20 from the reading head 15 is varied. A position problem caused by the change in the spacing $Y_0$ is added to all the position interference variables in the y direction for the motion of the objective 20 relative to the CD 25 at a first summation point 100. The result is the total position error $\Delta Y$ of the track control in the y direction. A position pickup 105 converts the total position error $\Delta Y$ into the electrical position error signal TE. Parasitic signals $E_{1T}$ are superimposed on the position error signal TE at a second summation point 110; these parasitic signals originate in defects of the CD 25 and interfere with the position determination in the y direction. The resultant signal $V_T$ is supplied to a correction network 115 of the track controller. This is an electric circuit whose function is that of a filter, and which must assure the stability and the static and dynamic accuracy of the control. The output signal of the correction network 115 is then supplied to the power amplifier 85.

The focus control circuit is shown in FIG. 2 and analogously to the track control circuit includes a power amplifier 86, which is connected to an actuator 91. The actuator acts via the force $F_F$ on the objective 20 in its elastic suspension, represented by reference numeral 96. A change in the spacing $Z_0$ of the objective 20 from the reading head 15 is added as a position interference variable in the z direction, at a first summation point 101, to all the position interference variables in the z direction of the motion of the objective 20 relative to the CD 25. The total position error of the focus control in the z direction is then $\Delta Z$. A position pickup 106 converts the total position error $\Delta Z$ into an electrical position error signal FE. Parasitic signals $E_{1F}$ which originate in defects on the CD 25 and interference of the position determination in the z direction are superimposed on the position error signal FE on at a second summation point 111. The resultant signal $V_F$ is supplied to a correction network 116 of the focus control. Once again, this is an electronic circuit with the function of a filter, which must assure the stability and the static and dynamic accuracy of the focus control. For the given reading head 15 and given assembly systems, the two correction networks 115 and 116 of the two position control circuits define both the resistance to vibration of the CD drive in a car radio and its tolerance to defects of the CD 25. Each control circuit can be defined by its transmission function when the control circuit is open; the transmission function is the product of all the transmission functions in the corresponding blocks of the applicable block circuit diagram of FIG. 1 or FIG. 2.

There are three different types of interference variables that are delivered to the two control circuits. First, they are problems that are expressed as inertial forces on the objective 20 of the reading head 15 which has the mass $M_4$. They are $M_4 \ddot{y}_4$ in the y direction and $M_4 Z^*_4$ in the z direction. The inertial force $M_4 \ddot{y}_4$ is superimposed on the force FT at a third summation point 120 of the track control circuit, and the inertial force $M_4 Z^*_4$ is superimposed on the force FF at a third summation point 121 of the focus control circuit. The inertial forces originate in the accelerations $\ddot{y}_0$ and $z^*_0$ of the car radio housing 1 on the basis of the vibration spectrum 75. These accelerations are transmitted via the chain of mechanical systems.

The conversion of the acceleration $\ddot{y}_0$ of the car radio housing 1 in the y direction into the inertial force $M_4 \ddot{y}_4$ takes place in FIG. 1 in block 201, which is characterized by a corresponding mechanical transmission function $S_{0y}$. The conversion of the accelerator $z^*_0$ of the car radio housing 1 in the z direction into the inertial force $M_4 Z^*_4$ takes place in FIG. 2 in the block 202, which is characterized by the mechanical transmission function $S_{0z}$. The reading head 15 accordingly undergoes the accelerations $\ddot{y}_4$ and $Z^*_4$.

Other position interference variables result from the relative motions of the reading head 15 and CD 25 with respect to the fundamental substrate 10. As the position interference variable of the track control circuit, what happen first are the changes in the radial positions of the tracks read from the CD 25 relative to the fundamental substrate 10 during the rotation of the CD 25 that occur as a consequence of the eccentricity of the CD 25, which is added as an interference variable $Y_1$ at the first summation point 100. The eccentricity of the CD 25, as the source for the track position error $Y_1$, is represented in the block circuit diagram of FIG. 1 by a block 205. In the z direction, changes in the axial positions of the track read from the CD 25 relative to the fundamental substrate 10 result during the rotation of the CD 25. These changes can be ascribed to a vertical beat of the CD 25, and are represented in the block circuit diagram of FIG. 2 by reference numeral 206. The resultant interference variable in the z direction $Z_1$ is superimposed on the other position interference variables at the first summation point 101. The interference variables resulting from the changes $Y_1$ and $Z_1$ are essentially of low frequency.

Position changes of the CD 25 also result from the fact that the CD 25 is fastened between the two plates 60 and 65 with a limited force. The CD 25 therefore moves both radially and axially, that is, both in the y direction and the z direction in its fastening device. This motion of the CD 25 and the y direction is represented in FIG. 1 by reference numeral 210 and causes a position deviation $Y_2$, which is superimposed at the first summation point 100 on the other position interference variables of the track control circuit. The same is correspondingly true for the position change in the z direction of the CD 25, which represented by reference numeral 211 in FIG. 2 and results in the position interference variable $Z_2$, which is again superimposed along with the other position interference variables of the focus control circuit at the first summation point 101. The position interference signals $Y_2$ and $Z_2$ represent instances of higher-frequency interference.

Because the CD motor 30 is fastened to the fundamental substrate 10, assembly-dictated motions of the CD 25 occur in the radial direction; they are indicated in FIG. 1 by reference numeral 215 and lead to a relatively slight change in the spacing $Y_3$ between the fundamental substrate 10 and CD 25, which again is superimposed on the other position interference variables at the first summation point 100. The oscillatory motion of the other edge of the CD 25 relative to its center and perpendicular to the plane of the CD 25 in a bell shape has already been described and is indicated in FIG. 2 by reference numeral 216. It leads to a change in the $Z_3$ of the outer edge of the CD 25 from the fundamental substrate 10, which again is superimposed on the other position interference variables at the first summation point 101.

Finally, position changes of the reading head 15 relative to the fundamental substrate 10 also occur because of the elastic assembly of the reading head 15. The reading head 15 vibrates relative to the fundamental substrate 10 at the natural frequencies $f_{4y}$ in the y direction and $f_{4z}$ in the z direction, with the damping constants $a_{4y}$ in the y direction and $a_{4z}$ in the z direction. This relative motion of the reading head 15 relative to the fundamental substrate 10 is indicated in FIG. 1 by reference numeral 220 and results in the change in the spacing $Y_4$ between the fundamental substrate 10 and the reading head 15, which is superimposed on the other position interference variables at the first summation point 100. The corresponding motion of the reading head 15 relative to the fundamental substrate 10 in the z direction is indicated in FIG. 2 by reference numeral 221 and produces the changes in the spacing $Z_4$ between the fundamental substrate 10 and the reading head 15, which are superimposed at the first summation point 101 on the other position interference variables in the z direction. The position interference variables $Y_2, Y_3, Y_4$ and $Z_2, Z_3, Z_4$ are caused by the accelerations $\ddot{y}_2$ and $z^*_2$ of the fundamental substrate 10, which result from the accelerations $\ddot{y}_0$ and $z^*_0$ of the car radio housing 1 from transmission over the chain of mechanical systems. The corresponding mechanical transmission function $S_{1y}$ for the position changes in the y direction is indicated in FIG. 1 by reference numeral 225, and the corresponding mechanical transmission function $S_{1z}$ for the position changes in the z direction is indicated in FIG. 2 by reference numeral 226. The resultant position changes in the y direction and the z direction are each, in this example, in a frequency range between 2 Hz and 500 Hz.

The third category of interference variables, finally, is defects of the CD 25. The resultant interference variables are superimposed in the position error signal TE or FE in the form of the signals $E_{1T}$ and $E_{1F}$, respectively, which have the form and spectrum of a pulse and are located in the frequency range between 2 kHz and 20 kHz, in this example.

To reduce the total position errors $\Delta Y$ and $\Delta Z$ in the y direction and z direction, respectively, for a given frequency, it is necessary that the amount of the transmission function $T_T$ for the track control circuit and $T_F$ for the focus control circuit be high at the frequencies, when the control circuit is open.

The amount of the respective transmission function with the control circuit open, in the frequency band in which the maximum values of the amplitudes of the relative motion of the CD 25 relative to the scanner 15, 20 and of the accelerations acting on the scanner 15, 20, must be large enough that the total position error $\Delta Y$ or $\Delta Z$, respectively, does not exceed the maximum allowable values.

The correction network 115 or 116 in the respective control circuit has multiple functions:

1. Assuring stability;
2. Assuring increased static and dynamic amplification between 0 Hz and 500 Hz to compensate for vibration;
3. Assuring increased damping when the control circuit is closed in the frequency range between 500 Hz and 20 kHz, in order to reduce the sensitivity to defects of the CD 25.

To perform these functions, the respective correction network 15, 116 includes a controller, whose time constants are selected such that the width of the respective frequency band for the control is adapted to the frequency range having the maximum amplitude values caused by the vibration spectrum 75, and the predetermined stability reserve is adhered to. The controller is preferably in the form of a PID controller with a proportional amplifier, an integrator, and a differentiator, for instance as in FIG. 11. There an input voltage $U_e$ of the PID controller is amplified by a proportional amplifier 230 with the proportional amplification $A_P$. The input voltage $U_e$ is also differentiated in accordance with time in a differentiator 240 and multiplied by a differentiation time constant $\tau_D$. Finally, the input voltage $U_e$ is integrated over time in an integrator 235 and divided by an integration time constant $\tau_I$. The output variables of the proportional amplifier 230, integrator 235 and differentiator 240 are superimposed in an adder 245 and form the output signal $U_a$. The respective correction network 115 and 116 also includes a low-pass filter for band limitation. The time constants of the PID controller and of the low-pass filter are selected such that a predetermined stability reserve is adhered to; that the width of the respective frequency band for the control is adapted to the frequency range in which the maximum values for the amplitudes of the relative motion of the recording medium 25 with respect to the scanner 15, 20 and of the accelerations acting on the scanner 15, 20 is located; and that the amplification in the respective frequency band for the control does not undershoot a predetermined value.

FIG. 8 shows the Black graph of two transmission functions $T_{T1}$ and $T_{T2}$ of the track control circuit when the control circuit is open, and FIG. 9 shows the Black graph of two transmission functions $T_{F1}$ and $T_{F2}$ of the focus control circuit when the control circuit is open. On the ordinate in each case the amplification factor G is plotted in dB, and on the abscissa the phase $\phi$ is plotted in degrees. The curves shown in the black graphs are parametrized in accordance with the frequency. The point having the gain factor of zero and a phase of −180° is the point of maximum instability in each case. The Black contour in the form of an ellipse in each graph also leads to overswings at the jump response of 2.3 dB or 30%, respectively. To assure good stability of control and adequate damping when the control circuit is closed, it is as a rule sufficient if the curves of the transmission functions in the Black graph remain outside the Black contour with an overswing behavior of 2.3 dB. The farther the curves for the transmission functions are from the point of maximum instability, at 0 dB and a phase of −180° for a given frequency, the better the transient response of the system for a closed control circuit at this frequency, and accordingly the less sensitive the system is to defects of the CD 25, which as described do lead to pulselike interference variables.

For the control circuits described thus far, the curves for the transmission functions $T_{T1}$ and $T_{F1}$ as shown in FIGS. 8 and 9, respectively, result; in them, the parametrizing in accordance with frequencies is represented by circles. For the track control circuit, a maximum amplification of 88 dB occurs at a frequency of 32 Hz, which has been selected as the natural frequency in the y direction for the suspension of the objective 20. The amplification is still 62 dB at 50 Hz, but is no more than 25 dB at 200 Hz.

For the focus control circuit of FIG. 9, the maximum amplification is 80 dB, again at a frequency of 32 Hz, which has also been selected as a natural frequency for the suspension of the objective 20 in the z direction. The amplification values here are still below those for the track control circuit.

It is important that in the range of the maximum spectral density of the vibration spectrum 75 between 10 Hz and 30 Hz, or taking into account a margin of safety between 10 Hz and 60 Hz, the amplification factors G of the control circuits not undershoot a particular predetermined value, so that in this range position errors in the scanning operation by the scanner 15, 20 will be compensated for as well as possible by the control circuits. In the examples shown in FIGS. 8 and 9, the amplification factors G in the range between 10 Hz and 60 Hz are all above approximately 40 dB.

By a suitable choice of the time constants of the differentiator 240, which are represented by $\tau_D$ in FIG. 11, the width of the respective frequency band for the control can be adapted to the frequency range in which the maximum values of the amplitudes of the relative motion of the CD 25 with respect to the scanner 15, 20 and of the accelerations acting on the scanner 15, 20 are located, while at the same time the predetermined stability reserve in the form of the 2.3 dB Black contour is adhered to. By means of this provision, a shift in the gain-crossover frequency on the 0 dB axis is brought about, and thus the frequency range for the amplification is shifted suitably. Thus by reducing the time constants, the gain-crossover frequency and thus also the amplification for frequencies below the new gain-crossover frequency are increased. At the same time, by a suitable choice of the time constants of the differentiator 2.40 in the range of the Black contour of 2.3 dB, a suitable phase lead can be established, so that the curve of the transmission function with the control circuit open is as much as possible located at the edge of this Black contour or even better outside the Black contour. In this way, the predetermined stability reserve can be adhered to at the same time. Simultaneously, this also means that particularly in the amplification range, the curve of the transmission function becomes steeper or shallower, so that by this means as well, a certain influence can be exerted on the magnitude of the amplification.

By a suitable choice of the time constants, represented by $\tau_I$, of the integrator 235 in FIG. 11, the possibility exists of increasing the amplification in the applicable frequency band for the control to a first, predetermined value. In "Halbleiterschaltungstechnik" [Electronic Circuits—Design and Applications] by Tietze and Schenk, 9th Edition, 1991, page 944, this amplification increase is effected predominantly at low frequencies, that is, in the range in which the two control circuits should compensate for the position problems. The time constants of the integrator 235 must be selected such that the predetermined stability reserve is adhered to. Accordingly, the time constants of the integrator 235 must be selected such that the curve of the transmission function in the range of the Black contour of 2.3 dB is not shifted overly far into the inside of this black ellipse. Optionally, this can also be prevented, in cooperation with suitable time constants of the differentiator 240, by a corresponding phase lead in the critical range of the Black ellipse.

Finally, the possibility also exists, by increasing the amplification $A_P$ of the proportional amplifier 230 in the respective control circuit, of shifting the curve of the respective transmission function in the direction of the amplification axis toward greater amplification, so that both the bandwidth of the frequency band for the control and the amplification are each raised to a second, predetermined value. As can be inferred from FIG. 8 in FIG. 9, the curve of the respective transmission function, for a frequency range above the gain-crossover frequency on the 0 dB axis, is then shifted into the interior of the Black contour of 2.3 dB, so that in this frequency range the predetermined stability reserve is not adhered to. The interference signals caused by defects in the CD 25 are located in this frequency range, which is above 1.5 kHz, and the signals can thus no longer be adequately damped, since they are located too close to the critical point of maximum instability at 0 dB and −180°. If the curve of the transmission function in this frequency range can no longer be removed from the interior of the Black contour of 2.3 dB by a suitable phase lead by means of a suitable choice of the time constants of the differentiator 240, then interference signals must be prevented from occurring in this frequency range. The same is optionally true for an amplification increase, for instance by means of the integrator 235 and/or the proportional amplifier 230, as described above. To that end, the rotational speed of the CD 25 can be increased to such an extent that the frequencies of these interference signals are in a frequency range in which a predetermined damping by the applicable control circuit is not undershot. If the predetermined stability criterion is to be met, thus must be a frequency range in which the curve of the respective transmission function is located outside the Black contour of 2.3 dB. Doubling the rotational speed of the CD 25 also doubles the frequency of the interference signals, and quadrupling the rotational speed leads to a quadrupling of the frequency of the interference signals.

A further provision for increasing the amplification at those points, in the respective frequency band for the control, where the amplitudes of the relative motion of the CD 25 with respect to the scanner 15, 20 and the accelerations acting on the scanner 15, 20 are maximal, is to integrate a preamplifier with the applicable correction network 115 or 116. In FIG. 7, the course of the amplification G is plotted in decibels and the phase φ is plotted in degrees, in each case as a function of the frequency f in Hertz of a suitable additional amplifier. In FIG. 7, the use of the additional amplifier leads to an increase of 13 dB in the amplification in the range of 100 Hz; then a phase lag of only −40° occurs at 150 Hz, and the phase lag for frequencies higher than 400 Hz is between 0 and −20°. The effect of the additional amplifier described on the curves of the transmission functions $T_{T1}$ and $T_{F1}$, whose frequency parametrizing is represented by circles, is shown in the form of the resultant new curves for the transmission functions $T_{T2}$ in FIG. 8 and $T_{F2}$ in FIG. 9; the frequency parametrizing for these new curves is represented by plus signs. The additional amplifier is dimensioned such that its maximum amplification at a frequency at which the amplitudes of the relative motion of the CD 25 with respect to the scanner 15, 20 and the accelerations acting on the scanner 15, 20 also are at a maximum. These amplitudes and accelerations can thus be compensated for optimally. In the curves for the transmission functions $T_{T2}$ and $T_{F2}$, the time constants of the differentiator 20, integrator 235, and low-pass filter have also been selected suitably so as to improve the control conditions in the frequency range in which the amplitudes of the relative motion of the CD 25 with respect to the scanner 15, 20 and the accelerations acting on the scanner 15, 20 are maximal, or in other words to increase the amplification in the frequency range from 0 to 500 Hz, and to increase the damping, for a closed control loop in the frequency range between 2 kHz and 20 kHz, in which as a rule the interference signals caused by defects of the CD 25 are located.

In the two Black graphs of FIGS. 8 and 9, it can be seen that both for the curve of the transmission function $T_{T2}$ and for the curve of the transmission function $T_{F2}$, the amplifications in the frequency band from 0 to 500 Hz are greater than those for the same frequencies in the curves for the transmission functions $T_{T1}$ and $T_{F1}$, respectively. Thus the maximum amplification spacing of 20 dB for the track control circuit or 17 db for the focus control circuit is at the frequency of 100 Hz, at which the additional amplifier has a maximum amplification of 13 dB. The phase lag of the additional amplifier of FIG. 7 for frequencies above 100 Hz also makes itself felt, and then in the phase graph of FIG. 7 becomes negligible at higher frequencies, beyond approximately 500 Hz for the track control circuit and approximately 1000 Hz for the focus control circuit. For the frequency band between 1 kHz and 10 kHz, the two control circuits have the same stability reservoir and the same damping when the control circuit is closed, since the curves for the transmission functions $T_{T2}$ and $T_{F2}$ remain virtually identical to the curves for the transmission functions $T_{T1}$ and $T_{F1}$ outside and on the edge of the Black contour at 2.3 dB. The gain-crossover frequency on the 0 dB axis has risen to over 2000 Hz for the track control circuit of FIG. 8 for the curve $T_{T2}$ compared with the curve $T_{T1}$. In the case of the focus control circuit, the gain-crossover frequency on the 0 dB axis has risen from 1500 Hz to 2000 Hz. This is due to the choice of the time constants of the differentiator 240. The frequencies on the curves of the transmission functions $T_{T2}$ and $T_{F2}$ have therefore shifted to higher values, compared to the frequencies on the curves of the transmission functions $T_{T1}$ and $T_{F1}$, respectively. Thus the 8000 Hz point assumes virtually the same position for curve $T_{T2}$ and for curve $T_{F1}$ as the frequency of 5000 Hz assumed for the curves $T_{T1}$ and $T_{F1}$, respectively. Because of the described improvements in control of the two control circuits, it is possible to mount a CD drive in the car radio housing 1 without additional spring and damping means.

In the assembly of the coupled mechanical oscillator of FIG. 4, in the exemplary embodiment selected, a frequency value of approximately 60 Hz for the natural frequency of the fundamental substrate 10 and the natural frequency of the CD drive housing 5 is not undershot. Thus the oscillations of the fundamental substrate 10 mounted in the CD drive housing 5 have maximum amplitudes of only ±0.5 mm; hence no spring and damping means are needed, and space is saved. For the same reason, choosing the natural frequency of the reading head 15 and/or of the objective 20 above this frequency of 60 Hz would be advantageous. By omitting spring and damping means, an arbitrary installation position of the CD drive in the car radio housing 1 and improved temperature performance and aging can be attained, since the spring and damping means are normally made of temperature— and aging-dependent viscous or elastomer material. On the other hand, the masses, natural frequencies and damping constants of the coupled mechanical oscillator of FIG. 4 must be selected such that the frequencies at which the amplitudes of the relative motion of the CD 25 with respect to the scanner 15, 20, and the accelerations acting on the scanner 15, 20 are maximal, in this example, undershoot a predetermined value of 200 Hz.

Above this value, in the exemplary embodiment selected, it is possible only at great effort to increase the local amplification by means of an additional amplifier or by means of a correction network improved by a suitable choice of time constants.

A preferred version for adhering to this upper limit frequency of 200 Hz is obtained for instance whenever the CD 25 is mounted on the fundamental substrate 10 with a natural frequency which is greater than or equal to 180 Hz, and in which the reading head 15 is mounted on the fundamental substrate 10 with a natural frequency that is greater than or equal to 200 Hz. In this version, the natural frequency of the CD drive housing 5, at 130 Hz is also selected to be greater than 60 Hz, and the same is true for the natural frequency of the fundamental substrate 10 at 160 Hz. The maximum position errors then occur at 100 Hz or in the vicinity of 100 Hz, and an additional amplifier with maximum amplification at 100 Hz corrects these position errors, without lessening the stability or the tolerance to defects of the CD 25.

Very generally, it is possible to correct any maximum position error in the frequency band between 60 Hz and 200 Hz, as long as the system remains within the limits in which it is linear; that is, as long as the accelerations that act on the fundamental substrate 10 do not exceed the limit defined by the forces which suppress mechanical play, as long as the control range of the reading head 15 is not exceeded and as long as the control voltages for tracking the objective 20 do not become saturated.

If as shown in FIG. 10 the CD 25 is fastened between the first plate 60, with a diameter $d_2$ of 30 mm, and the second plate 65, with a diameter 3 which is greater than or equal to 60 mm, the natural frequency of the CD 25 is on the order of magnitude of 180 Hz or higher. To achieve this, however, it is necessary that the fastening forces that act on the first plate 60 be distributed along a circle with a diameter of approximately 30 mm, and that the fastening force that act on the second plate 65 be distributed over a circle with a diameter of approximately 60 mm or more, thus generating bending moments which deform the CD 25 slightly in bell-shaped fashion in the axial direction, that is, the z direction. By way of example, this is attained by providing an annular protrusion 250, having the same radius $d_3$ as the second plate 65, on the side of the second plate 65 toward the first plate 60. To reinforce this bell-shaped deformation, an annular protrusion 255 with the radius $d_2$ can also be provided in FIG. 10 on the side of the first plate 60 toward the second plate 65. The bending of the CD 25 between the protrusion 70 of the first plate 60 for centering the CD 25 and the annular protrusion 250 of the second plate 65 is $d_4$ and is between 0.1 and 0.2 mm, if $d_3$=60 mm, and if the diameter $d_1$ of the opening 260 of the CD 25 through which the protrusion 70 extends is 15 mm. The fastening force $F_S$ acts centrally on the second plate 65 in the direction of the CD motor 30. The force $F_S$ must be sufficiently high to deform the CD. A suitable value is for instance $F_S$=3N. In order not to burden the motor shaft 55 excessively, a permanent magnet can be incorporated into the first plate 60 that cooperates with a ferromagnetic part in the second plate 65, or vice versa. With the aid of springs, the play of the motor shaft 55 in the z direction can then be suppressed; for example, a spring force of 1.5 N is employed.

The first plate 60 may also be made of a damping material which is easily deformable in the z direction and can be bent like a diaphragm. This elastic mounting using a damping material makes it possible to increase the damping constants substantially, for instance by using polyurethane for the first plate 60. As a result, the amplitudes of the oscillations of the CD 25 are reduced, and the focus control is made easier.

A higher natural frequency for the CD 25 can be attained by increasing the diameter $d_3$ of the second plate 65 further. Thus 200 Hz can be achieved, for a diameter of 70 mm.

The parameter values given in the exemplary embodiment described are merely examples and should be selected as needed.

What is claimed is:

1. A method for controlling the focusing of a light beam, aimed at a rotating recording medium (25) for reading data, of a scanner (15, 20) onto the recording medium (25) and the guidance of the light beam along the data tracks of the recording medium (25), each by means of a respective control circuit, characterized in that the scanner (15, 20) and the recording medium (25) are mounted on a fundamental substrate (10) in at least one housing (1), and the at least one housing (1), together with the fundamental substrate (10), the scanner (15, 20) and the recording medium (25), forms a coupled mechanical oscillator, which is vibrated as a function of a vibration spectrum (75); that the scanner (15, 20) is accelerated by the vibration and a relative motion of the recording medium (25) with respect to the scanner (15, 20) is effected, and the amplitudes of the relative motion and the accelerations have a frequency response; that the masses, spring constants and damping values of the scanner (15, 20), the recording medium (25), the fundamental substrate (10), and the at least one housing (1) are selected such that the frequencies at which the amplitudes of the relative motion of the recording medium (25) relative to the scanner (15, 20) and the accelerations acting on the scanner (15, 20) are maximal are located in a frequency band of the respective control circuit in which an amplification is performed, and the maximum values of the amplitudes in that frequency band do not exceed a predetermined value.

2. The method of claim 1, characterized in that the masses, spring constants and damping values of the scanner (15, 20), the recording medium (25), the fundamental substrate (10), and the at least one housing (1) are selected such that the frequencies at which the amplitudes of the relative motion of the recording medium (25) relative to the scanner (15, 20) and the accelerations acting on the scanner (15, 20) are maximal exceed a value of approximately 60 Hz.

3. The method of claim 1, characterized in that the time constants of a differentiator (240) in the respective control circuit are selected such that the width of the applicable frequency band for the control is adapted to the frequency range in which the maximum values of the amplitudes of the relative motion of the recording medium (25) with respect to the scanner (15, 20) and of the accelerations acting on the scanner (15, 20) are located, and the predetermined stability reserve is adhered to.

4. The method of claim 1, characterized in that the time constants of an integrator (235) in the respective control circuit are selected such that the amplification in the applicable frequency band for the control is increased to a first predetermined value, and the predetermined stability reserve is adhered to.

5. The method of claim 1, characterized in that with a proportional amplifier (230) in the respective control circuit, an increase in amplification and bandwidth of the frequency range for the control, in each case to a second predetermined value, is performed.

6. The method of claim 1, characterized in that the amplification, at the points in the respective frequency band for the control at which the amplitudes of the relative motion of the recording medium (25) with respect to the scanner (15, 20) and the accelerations acting on the scanner (15, 20) are maximal is preferably increased by means of an additional amplifier.

7. The method of claim 1, characterized in that in the assembly of the coupled oscillator, a predetermined frequency value, in particular approximately 60 Hz, is not undershot by the natural frequency of the fundamental substrate (10) and/or by the natural frequency of the at least one housing (1).

8. The method of claim 1, characterized in that in a frequency range of maximum spectral density of the vibration spectrum (75), a particular predetermined value is not undershot by the amplification factors of the control circuits, the value being predetermined such that a predetermined control precision of the control circuits is adhered to.

9. The method of claim 1, characterized in that the rotary speed of the recording medium (25) is selected such that the frequencies of interference signals, which because of defects in the recording medium (25) are superimposed on the position error signals formed from housing vibration in the respective control circuit, are located in a frequency range in which a predetermined damping is not undershot by the applicable control circuit.

10. The method of claim 1, characterized in that the recording medium (25) is fastened between a first plate (60), driven by the shaft (55) of a motor (30), and a second plate in such a way that the natural frequency of the recording medium (25) is within a predetermined range, and in particular above approximately 60 Hz.

11. The method of claim 1, characterized in that the radius of the second plate (65) is selected to be greater than the radius of the first plate (60) and that on the side of the second plate (65) toward the first plate (60), an annular protrusion (250) having the radius of the second plate (65) is mounted, so that the recording medium (25) is fastened in bell-like fashion between the two plates (60, 65).

12. The method of claim 1, characterized in that the coupled mechanical oscillators are disposed in a motor vehicle, and the vibration spectrum (75) results as a function of the vibration acting on the motor vehicle.

\* \* \* \* \*